Sept. 16, 1952   D. F. McGILL   2,610,468
ROTARY HYDRAULIC TORQUE CONVERTER
Filed June 24, 1946   4 Sheets-Sheet 1
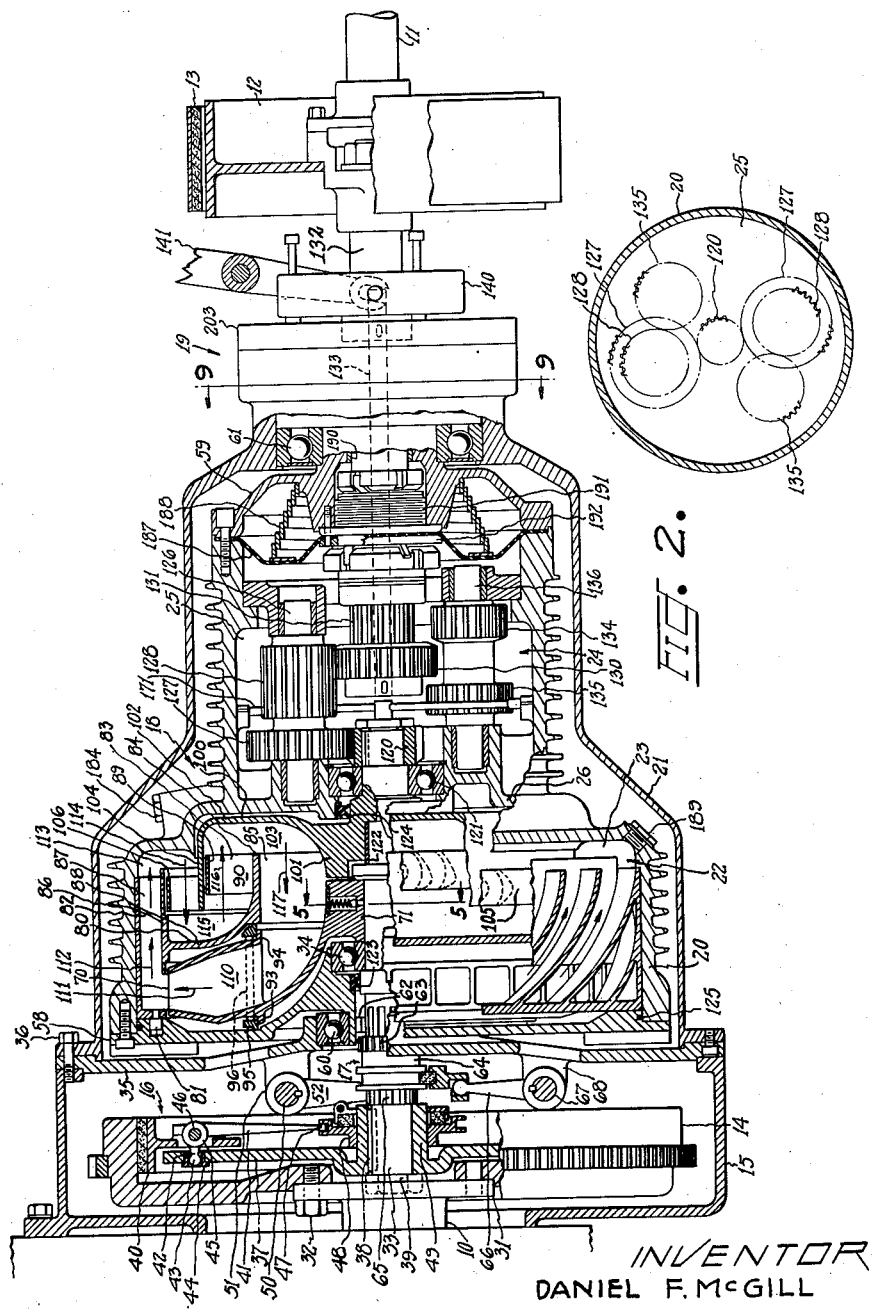
INVENTOR
DANIEL F. McGILL
BY Cook and Schermerhorn
ATTORNEYS

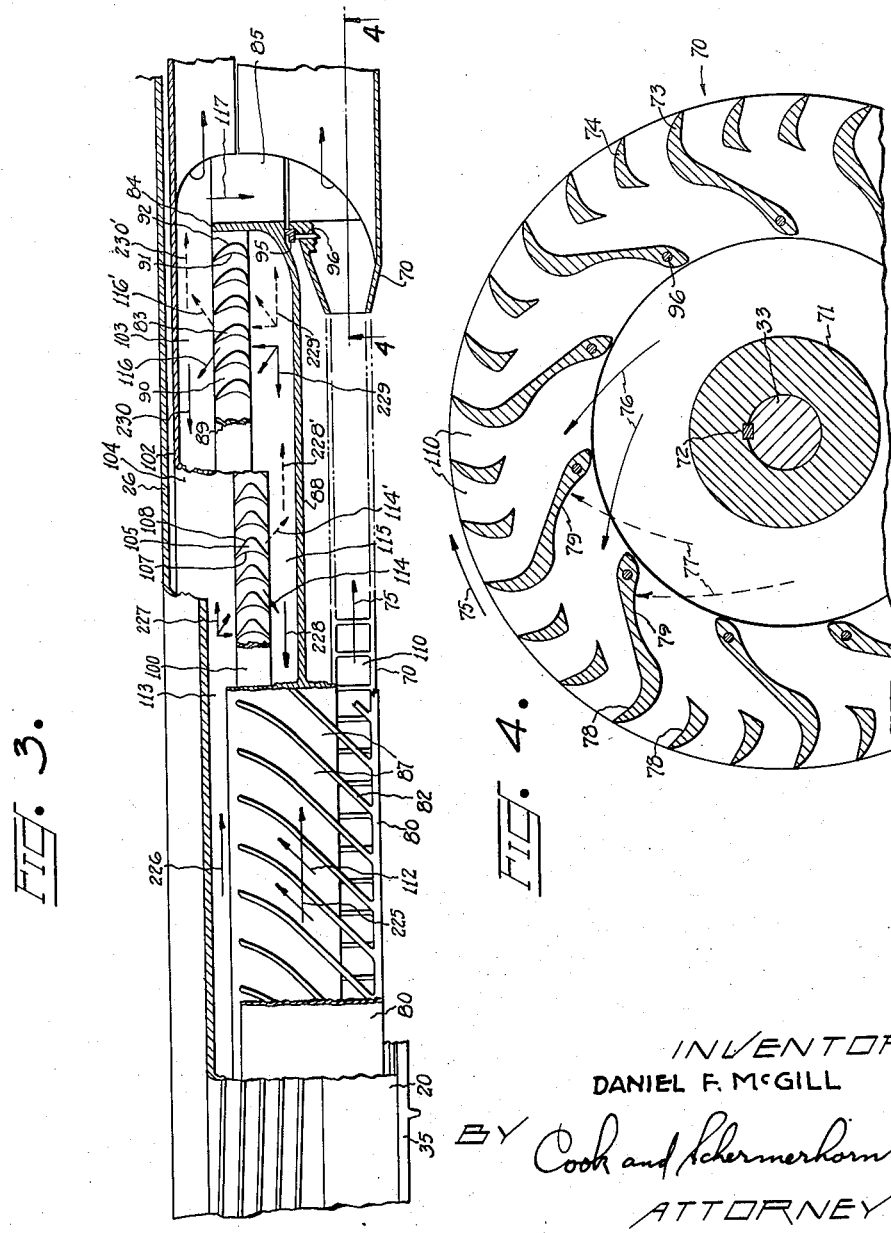

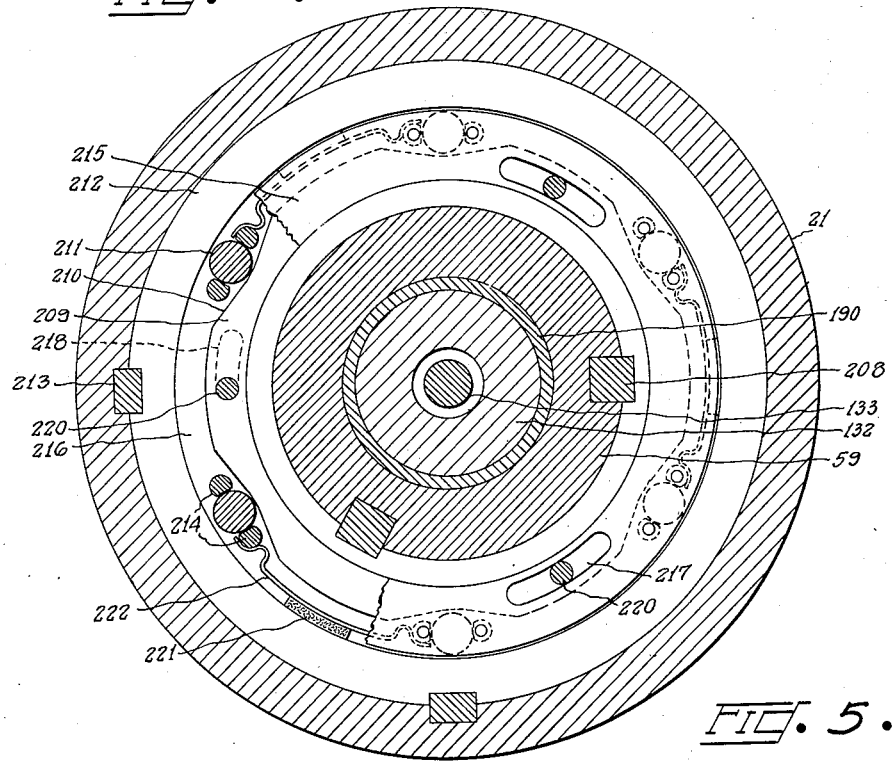
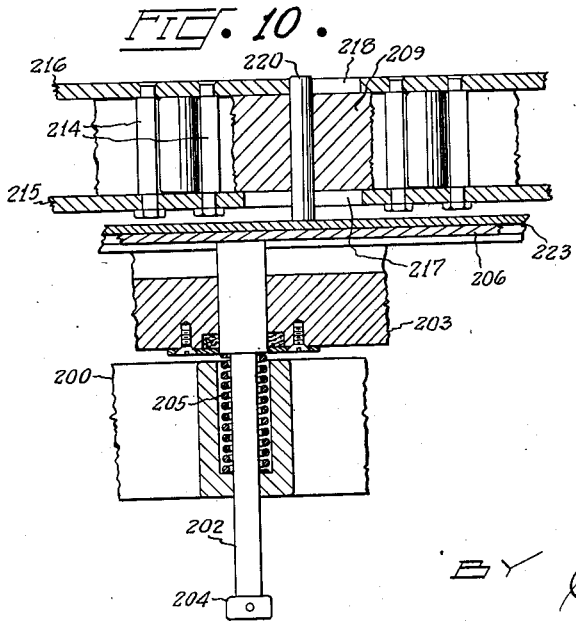
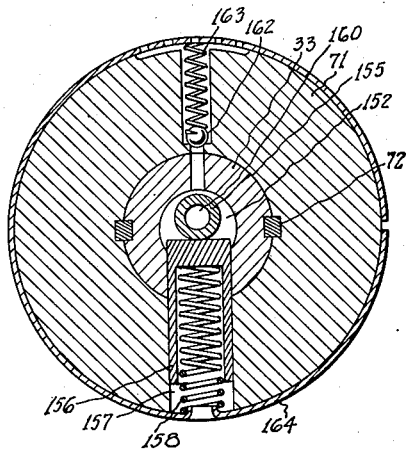

Sept. 16, 1952     D. F. McGILL     2,610,468
ROTARY HYDRAULIC TORQUE CONVERTER
Filed June 24, 1946     4 Sheets-Sheet 4
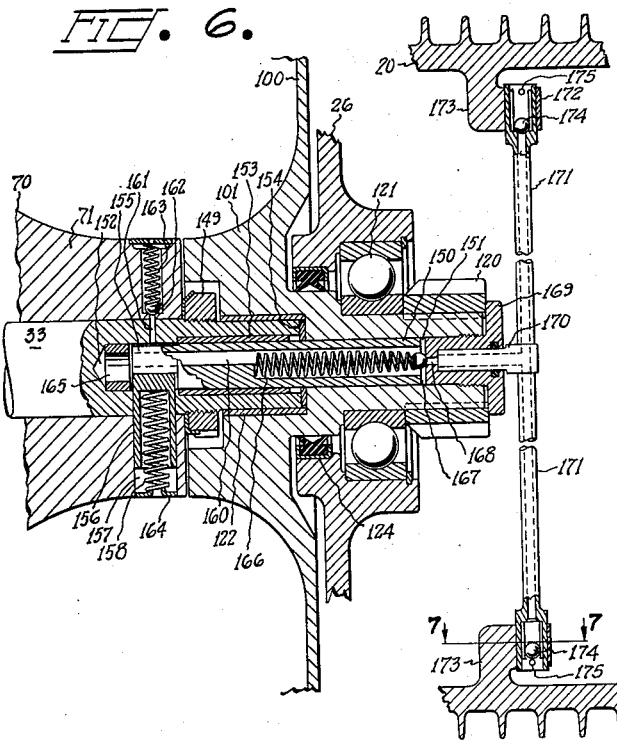
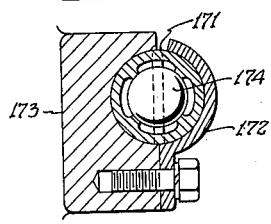
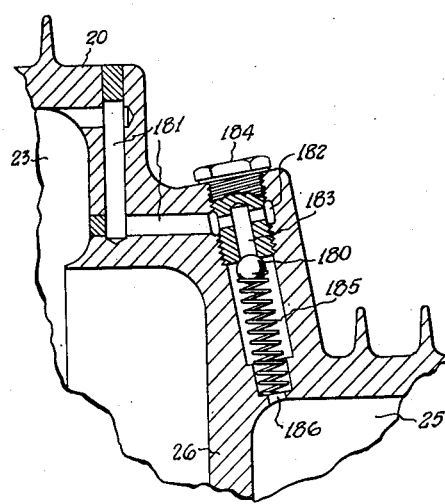
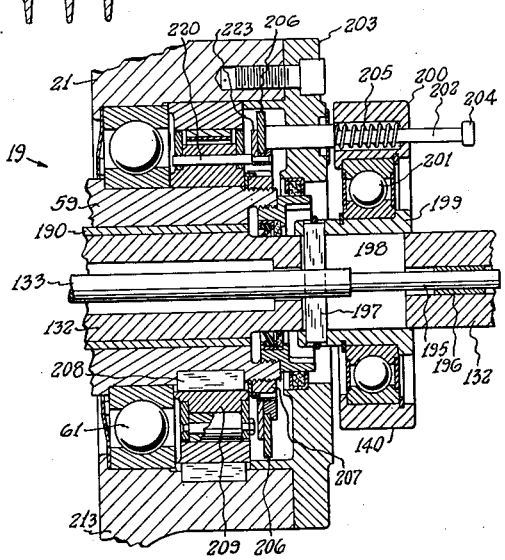
INVENTOR
DANIEL F. McGILL
BY Cook and Schermerhorn
ATTORNEYS Patented Sept. 16, 1952

2,610,468

UNITED STATES PATENT OFFICE 2,610,468

ROTARY HYDRAULIC TORQUE CONVERTER

Daniel F. McGill, Portland, Oreg., assignor to
Donald W. Green, trustee, Portland, Oreg.

Application June 24, 1946, Serial No. 678,902

22 Claims. (Cl. 60—54)

This invention relates to a power transmission of the type having interacting hydraulic and gearing components for transmitting torque from a driving shaft to a driven shaft in different speed and torque ratios.

The present transmission is especially suited to meet flexible power requirements, and the preferred embodiment of the invention is designed particularly for automotive use, but this application of the principles of the invention is to be taken as illustrative rather than as a limitation of the invention.

In the present transmission the power flow may be said to be divided into two parallel but not independent paths between the driving and driven shafts wherein the division of power between the two paths varies under different operating conditions to adjust the over-all torque multiplication and speed ratio to suit the demands of those conditions so as to constitute an automatic transmission. The hydraulic component of the transmission comprises three elements which interact with each other through the medium of the hydraulic fluid, and the gearing component comprises three interengaging elements, two of which are connected with two of the fluid driving elements. One of the elements of the fluid driving component is connected with the power input or driving shaft, and a third element in the gearing component is connected with the power output or driven shaft.

Specifically, the hydraulic driving component comprises an impeller, a turbine runner and a reaction member all having vanes in a common fluid circuit. The gearing component comprises essentially a sun gear, planet gears on a planet carrier and a driven gear on the power output shaft. The sun gear turns with the turbine runner, and the reaction member in the fluid driving component is integral with the planet carrier whereby one path of power flow in the transmission is through the turbine runner and sun gear and the other path is through the reaction member and planet carrier. By virtue of the interaction between the elements where these power flow paths divide and re-unite, one or the other of these paths may predominate in assuming a major portion of the load and under certain operating conditions the entire power flow may be directed exclusively through one of the paths. The variable division of the power flow in this manner occurs in response to external load and speed conditions and internal operating characteristics of the fluid driving component automatically to change the over-all driving ratio of the transmission to suit the external conditions of the moment.

This invention relates to improvements over transmissions of the general type disclosed in my copending applications, Serial No. 507,753, filed October 26, 1943, for Power Transmission Device, now Patent No. 2,465,739, issued March 29, 1949; and Serial No. 563,007, filed November 11, 1944, entitled Power Transmission System.

Improvement of the internal operating characteristics of the fluid driving component constitues one of the primary objects of the present invention. The degree of torque multiplication and the efficiency of transmission obtained in this component depend to a considerable extent upon the fluid flow patterns produced under different conditions. The nature of the flow patterns through the different sets of vanes and channels is especially important in a transmission for automotive or like use because the operating conditions which require a power transmission are so variable that the parts cannot be designed for any set standard conditions such as may be done in a steam turbine, for example, operating at a fixed speed under regulated steam pressure. Instead of compromising the design characteristics in an attempt to make the fluid flow pattern substantially the same under diverse conditions, the present design recognizes the tendency of the fluid to change its flow pattern under different conditions and provides for and utilizes this change as a contributing rather than a detrimental factor in the transmission and multiplication of torque.

Whereas in most conventional fluid transmission devices the hydraulic fluid is caused to circulate in a continuous toroidal path advancing around the common axis of the impeller and runner wherein the fluid flow is primarily in radial and axial directions with respect to this common axis as it advances circularly around the toroid, in the present transmission the fluid flow is directed back and forth in opposite axial directions through a plurality of working stages before it is returned to the eye of the impeller, and in between successive working stages and after the last stage it is directed in circular paths of varying diameters concentric with the common impeller and runner axis.

The fluid driving and gearing components of the transmission are contained within two chambers formed in a housing mounted for rotation in a stationary casing. An overrunning or one-way engaging brake is provided between the casing and the housing to prevent reverse rotation of the housing while permitting its forward rotation under normal forward driving conditions. Within the fluid driving chamber are contained the impeller, reaction member and runner, having novel and improved arrangements of vanes for directing a fluid circuit through this chamber in different directions under different operating conditions to obtain improved efficiency and greater multiplication of torque than in conventional fluid transmissions. In the gearing chamber the gearing component of the transmission comprises a sun gear mounted integrally with the runner and in constant mesh with a pair of gears on counter shafts mounted in the housing so as to function as planetary gears when the housing rotates whereby the housing itself constitutes a planet carrier for these planet gears. Other gears integral with the planet gears mesh with a driven gear mounted on a driven shaft in axial alignment with the sun gear and the rotating parts of the fluid transmission component.

The reaction member in the fluid transmission component carries two sets of vanes fixedly mounted in the transmission housing. A first set of vanes on the reaction member is of novel design and arrangement, and immediately surrounds the impeller to receive the entire fluid output therefrom. Under high torque conditions when the housing is stationary, the vanes in the first set act solely as guide vanes for delivering the fluid flow to a circular channel and then to the vanes of the runner at an advantageous angle of entry. After leaving the runner the fluid flow is next directed through a circular channel into the second set of vanes in the reaction member, from whence it returns through a circular channel to the eye of the impeller.

In the impeller the fluid travels radially outwardly as it revolves in a pumping action which produces a high velocity of flow through the various working stages in the fluid circuit. Upon leaving the impeller the fluid can travel in an outward direction no longer, and so it is turned by the housing to move through the guide vanes of the reaction member in an axial direction accompanying its circular motion within the housing. The fluid, therefore, travels in a helical path in the first set of vanes in the reaction member, and is moving with a high rotational velocity as it is directed into the vanes of the runner. A wall of the housing reverses the axial movement of the fluid from the guide vanes while facilitating its continuous rotational movement so that the fluid moves into the runner rotating in the same forward direction it has been traveling through the guide vanes but moving axially in the opposite direction as it enters the turbine runner. When the runner is stationary or revolving very slowly, the curved bucket shape of the runner vanes causes the fluid to leave the runner in a tangential direction opposite to its direction of entry, whereby the fluid is caused to circulate in a reverse direction around the housing. An annular chamber on the outlet side of the runner receives the fluid in reverse rotation and causes it to move radially inwardly in a tightening spiral path and then reverses its direction of axial movement as it enters the second set of vanes in the reaction member. These vanes are also of bucket shape, and under the assumed condition of stationary or substantially stationary housing, and stationary or slowly revolving runner, the rotating fluid impinges upon the back sides of the bucket vanes in the reaction member, thereby opposing the tendency in the first set of vanes in the reaction member to cause the housing to rotate in a forward direction. The fluid issues from these vanes still with a reverse rotary movement which continues as it returns in a spiral path in a large passageway leading back to the eye of the impeller. The impeller vanes are set at an angle to utilize this counter rotation of fluid flow to advantage by accelerating its radial movement to produce an unusually high radial velocity of the fluid in starting and under conditions when maximum torque multiplication is desired. Under the operating condition just described, both the gearing component and the second set of reaction vanes produce a counter torque on the housing in opposition to forward torque exerted in the first set of vanes in the reaction member. The reaction member then tends to rotate the housing backwardly, but such rotation is prevented by the overruning brake so that the housing is constrained to remain stationary.

As the description proceeds in connection with the preferred embodiment illustrated in the drawings, it will be noted that the fluid is discharged from working stages in each set of vanes through channels in a whirling motion providing an advantageous entrance angle into the next set of vanes. The axial direction of movement of the fluid changes from stage to stage as the fluid moves from one set of vanes to the next, but the parts are so designed that the velocity of rotary movement of the fluid far exceeds its velocity in axial or radial directions whereby these changes in direction do not produce any appreciable loss in energy in the system. An important feature of the present invention is the unique action which takes place when the runner reaches a certain critical speed with respect to the velocity of fluid circulation. It was noted hereinabove that when the runner is stationary or rotating very slowly, it operates to reverse the direction of rotation of the fluid so that the discharge from the runner rotates in a direction counter to its intake. However, at higher runner speeds the discharge from the runner will continue in the same direction as at entry so as to cause the direction of fluid flow to enter the bucket vanes of the reaction member to exert a torque in a forward direction on the reaction member and transmission housing. Because of the confined space in the annular passage on the discharge side of the runner, this flow change takes place abruptly at a certain critical speed converting the reaction member into a driving member. Forward rotation of the housing occurs whenever the forward torque exerted by both sets of vanes in the reaction member exceeds the reaction torque exerted upon the housing by the planet gears in the gearing component. When this occurs the housing leaves the abutment provided by the overrunning brake, and rotates in a forward direction at some speed less than that of the runner.

It is, therefore, a further object of the invention to provide a reaction member in a fluid driving component which is constructed and arranged to function as a driving member under certain operating conditions.

Another object is to provide a reaction member in a fluid driving component having a set of vanes arranged diagonally with respect to the vanes of an impeller to avoid power impulses and to receive the fluid discharge from said impeller to exert a guiding influence on said discharge and, at the same time, to develop torque to constitute said reaction member as an additional driving member under certain operating conditions.

Another object is to provide a transmission which will drive as a fluid coupling in substantially a 1 to 1 speed and torque ratio and which will respond to increased load by automatically producing a multiplication of torque to meet the additional demands.

Another object is to provide a transmission that will operate as a torque converter in starting or when higher torques are required and as a combination of fluid coupling and torque converter where less torque and more speed is desired.

Another object is to provide a fluid driving component in which there is no radial movement of the fluid in torque producing members.

Another object is to provide a fluid transmission component having a plurality of sets of torque producing vanes through which the fluid travels in generally axial directions.

Another object is to provide a fluid driving component having an impeller and working stages in which the fluid is directed axially and tangentially through successive working stages, and radially in a spiral path concentric with the axis of rotation of the parts from one working stage to the next and from the last working stage back into the eye of the impeller.

Another object is to provide a fluid driving component having a predominately circular flow of the fluid medium in which the direction of flow is abruptly reversed under certain operating conditions to change a reaction member in said component to a driving member.

Another object is to provide a fluid driving component in which the fluid medium is returned to the eye of the impeller in a predominately circular, rather than axial, motion.

Another object is to provide a transmission of the type described having a novel overrunning brake to prevent reverse rotation of a member in said transmission at all times, and capable of locking said member against rotation in either direction for a reverse drive through said transmission.

Another object is to provide a transmission having a fluid driving chamber and a gearing chamber constituting a reservoir for the fluid driving chamber and novel pump means connected with a suction tube in the gearing chamber to pump hydraulic fluid from said gearing chamber to said fluid driving chamber to maintain fluid pressure in the latter chamber under all operating conditions without pumping air from said reservoir.

Another object is to provide means in a transmission of the type described for locking the parts in a direct mechanical driving connection.

These and other objects will be better understood as the description proceeds in connection with the preferred embodiment shown in the accompanying drawings. It is to be understood, however, that the present embodiment is referred to for purpose of illustrating the principles of the invention and not for the purpose of limiting the invention. Various changes may be made in the construction and arrangement and in the proportions of the various parts, and all such modifications within the scope of the appended claims are included in the invention.

In the drawings:

Figure 1 is for the most part a longitudinal sectional view of the present transmission, showing the manner in which it may be used in an automobile or similar vehicle, certain parts being shown in elevation.

Figure 2 is a cross sectional view through the gearing component of the transmission;

Figure 3 is a developed view, with parts broken away, showing the fluid paths through the various sets of vanes and passages in the fluid driving component, and including a showing of certain of the parts in longitudinal cross section;

Figure 4 is a cross sectional view of the impeller, taken on the line 4—4 in Figure 3;

Figure 5 is a cross sectional view of the pump mechanism, taken on the line 5—5 in Figure 1;

Figure 6 is a fragmentary longitudinal sectional view through the pump mechanism and including the hydraulic fluid inlet tubes in the gearing chamber;

Figure 7 is a view taken on the line 7—7 of Figure 6, showing the mounting and ball check valve at the outer end of the inlet tube;

Figure 8 is an enlarged fragmentary view showing the pressure relief valve between the fluid driving chamber and the gearing chamber;

Figure 9 is a cross sectional view taken approximately on the line 9—9 of Figure 1, showing the overrunning brake mechanism;

Figure 10 is a fragmentary sectional view showing details of certain operating mechanism associated with the overrunning brake; and Figure 11 is an enlarged fragmentary longitudinal sectional view of the overrunning brake and associated mechanism, taken in the same plane as Figure 1 but including internal structure not shown in Figure 1.

The present transmission is illustrated in Figure 1 as installed in an automobile having an engine crank shaft 10 and a driven shaft 11 for transmitting torque from the crank shaft to the driving wheels of the vehicle in various transmission ratios. On the driven shaft 11 is a brake drum 12 having associated therewith a brake lining 13 which may be tightened on the drum by means of a hand lever to serve as a parking or emergency brake. The crank shaft carries an engine flywheel 14 enclosed in the usual stationary casing 15 bolted to the engine block.

General organization

The present transmission includes, in general, a friction clutch 16 for connecting the fluid impeller with the engine, a dog clutch 17 for connecting the transmission housing with the impeller, a transmission unit 18, and an overrunning or one-way engaging brake mechanism 19. The transmission unit 18 comprises a housing 20 rotatably mounted within a stationary casing 21 which is bolted to the flywheel casing 15. As will be hereinafter pointed out in connection with the description of the overrunning brake 19, its function is to prevent reverse rotation of the housing 20 with respect to the direction of rotation of the engine, while permitting its forward rotation at such times as the vehicle is intended to operate in a forward direction. Means are also provided in the overrunning brake for locking the housing 20 against rotation in either direction when elements in the transmission are shifted into a reverse gear to cause the driven shaft 11 to operate in a reverse direction. The transmission unit 18 further comprises a fluid driving component 22 contained within a fluid driving chamber 23, and a gearing component 24 contained within a gearing chamber 25, wherein the two chambers 23 and 25 are arranged in end to end relation on opposite sides of a transverse wall 26 in the housing 20. The fluid driving end of the transmission unit, as illustrated, has a diameter slightly less than the engine flywheel, and the gearing end of the unit has a considerably lesser diameter, whereby the unit may be mounted with the fluid driving end adjacent the flywheel casing of the engine so as to occupy approximately the same space under the floor of the vehicle as would be required by a conventional clutch and sliding gear transmission.

The clutch 16 provides for positively disconnecting the transmission unit 18 from the engine. The engine crank shaft terminates in a flange 31 to which the flywheel 14 is secured by means of bolts 32. A short power input shaft 33 has an inner end extending into the fluid driving chamber 23 supported in a bearing 34 and in a pilot bearing in a manner which will presently be described, and an outer end carrying a circular plate 37 within the rim of the flywheel. The plate 37 is fixedly secured on this shaft by means of a key 38 and a nut 39. Within the rim of the flywheel a plurality of arcuate clutch shoes 40 are mounted for radial movement on the plate 37, this movement being produced by the toggle action of a plurality of levers 41. The levers 41 have short bell crank arms 42 terminating in ball ends 43 fulcrumed in bushings 44 in the plate 37, and have eyes 45 forming bearings for pins 46 on the shoes 40 whereby the shoes may be withdrawn from contact with the flywheel by moving the lower ends 47 of the levers. The lever ends 47 ride in a circumferential groove or channel in a sliding collar 48 on the hub 49 of the flywheel. Springs are provided to act between the plates 37 and the shoes 40 to normally urge the latter into gripping engagement with the flywheel to drive the shaft 33. A shaft 50 mounted in a bracket 51 carries a yoke or finger 52 for moving the collar 48 to the left as viewed in Figure 1 against the spring action to disengage the clutch. The shaft 50 is intended to be connected with the conventional clutch pedal in the vehicle, and means may be provided if they are not already present for locking the pedal in the depressed position to maintain a positive neutral wherein there is no tendency for the shaft 11 or any parts within the transmission unit to revolve or creep when the engine is running and the vehicle is standing still.

The housing 20 is supported by end members 58 and 59 for rotation in bearings 60 and 61, the bearing 60 being supported in a plate 35, attached to the flywheel casing 15 by screws 36, and the bearing 61 being supported in the rear end of the casing 21. The previously mentioned bearing 34 for the shaft 33 is carried by the end member 58. The end member 58 is provided with internal teeth 62 adapted to engage comating teeth 63 on a collar 64 which is internally splined for longitudinal sliding movement on splines 65 on the shaft 33. The collar 64 may thereby be shifted into and out of engagement with the teeth 62 by means of a finger or yoke 66 on a shaft 67 mounted in a bracket 68. Both brackets 51 and 68 are carried by the plate 35. As shown in Figure 1, the housing 20 is normally free of the shaft 33 but may be positively connected therewith by rotating the shaft 67 by means of a conventional gear shifting lever on the vehicle to engage the teeth 63 with the teeth 62. With reference to the transmission unit 18, the shaft 33 may be regarded as the driving or power input shaft and the shaft 11 may be regarded as the driven or power output shaft.

*Fluid driving component*

Mounted on the inner end of the shaft 33 within the fluid driving chamber 23 is an impeller 70 having a hub 71 secured to the shaft by means of a key 72, as shown in Figure 4. The impeller has an open eye surrounding the hub and a rim portion carrying a plurality of large vanes 73 and a greater number of small vanes 74 to exert a pumping action upon the hydraulic fluid to cause it to circulate at high velocity in a working circuit through other sets of vanes in the fluid driving chamber to produce a torque multiplication in the fluid driving component of the transmission. The arrow 75 indicates the direction of rotation of the impeller as viewed from the flywheel end of the transmission. Under certain operating conditions, which will presently be described, the hydraulic fluid is returned to the eye of the impeller in a counterclockwise circular motion as indicated by the solid arrows 76, and under other operating conditions the fluid enters the eye of the impeller with a clockwise rotation as indicated by the broken line arrows 77. When the fluid enters in the direction of the arrows 76, the rotation of the impeller and the curvature of the large and small vanes, indicated at 78, changes the rotation of the hydraulic fluid from counterclockwise to clockwise in a high velocity discharge having radial and tangential components which are utilized to transmit torque to other sets of vanes mounted for rotation within the fluid driving chamber. The backward inclination of the vanes or blades 73 receives counterrotating fluid without shock or retardation to the flow, and the forward curvature at 78 of both the large and small vanes imparts a tangential throw to the fluid as it leaves the tips of the blades. When the fluid enters the eye of the impeller in the direction shown by the broken line arrows 77, it impinges first upon concave portions 79 at the inner ends of the large vanes, returning a certain amount of its kinetic energy back to the impeller. Then, as the fluid travels outwardly between the large and small vanes, the rotation of the impeller and the forward curvature of the surfaces 78 at the periphery of the impeller again cause the fluid to be discharged at a high velocity having radial and tangential components comprising in general a continuation and acceleration of flow in the direction of the arrows 77. This mode of operation and the advantages derived therefrom will be hereinafter discussed in greater detail.

Fixedly secured within the housing 20 is a reaction member 80, preferably provided with pins or the like 81, as shown in Figure 1, for transmitting its torque to the end member 58 of the housing. The reaction member 80 contains an outer set of vanes 82 surrounding the impeller and receiving the discharge therefrom, and an inner set of vanes 83 surrounding an inner cylindrical rim 84 defining a central opening or eye 85 having the same diameter as the eye of the impeller. A cylindrical rim 86 connects the inner edges of the outer vanes 82 to define radially closed passages 87 therebetween, and a curved wall 88 connects this rim with the rim 84. The outer ends of the vanes 83 are similarly connected and supported by a cylindrical rim 89 defining radially closed passages 90. The vanes 82 are set diagonally with respect to the impeller vanes to act as guide vanes to impart a rotational movement to the fluid body and to split the discharge streams from the impeller in all positions of the impeller. The individual discharge streams from the impeller are thereby cut off gradually without shock or power impulses as they are diverted from one of the passages 87 to the next when the impeller is rotating relative to the reaction member 80. The vanes 82 may be slightly curved as shown to enhance a fluid coupling action which exists between the impeller and this particular set of vanes in the reaction member. The blades 83 may be said to be of bucket shape, being curved to present concave faces 91 to clockwise moving fluid and convex faces 92 to counterclockwise moving fluid. These vanes are set in radial positions between the rims 84 and 89 and appear in side view as shown in full lines in Figure 1. The bucket shape of these vanes is best shown in Figure 3, where the rim 89 has been broken away to expose their ends.

The front and rear outer faces of the impeller are formed with aligned annular shoulders 93 and 94 carrying a pair of sealing rings 95. The rings 95 fit their respective shoulders closely and are spaced apart by a plurality of pins or struts 96, causing them to engage the end member 58 and the forward edge of the rim 84 of the reaction member 80. The pins 96 pass loosely through the impeller, and sufficient clearance is provided between the front and rear side walls of the impeller and the rings 45 so that the latter have freedom for limited axial movement on the shoulders 93 and 94. The rim 84 and the end member 58 are assembled together in rigid precise relationship, and the rings 95 revolve freely between these members with a minimum of friction while floating on the shoulders 93 and 94 to effect a balanced pressure seal between the relatively rotating parts without producing a drag therebetween. Accommodation is thereby provided for changes in the axial position of the impeller without destroying the seal or bringing the impeller into contact with other parts. The construction of this seal constitutes the subject matter of my copending application, Serial No. 575,001, filed January 29, 1945, for Floating Sealing Device, now Patent No. 2,452,253, issued October 26, 1948.

Also within the fluid driving chamber 23 is a runner 100 having a hub 101 rotatably mounted on a common axis with the shaft 33. The body of the runner comprises a shell 102 defining an annular fluid passage 103 and an elongated rim 104 carrying a plurality of bucket vanes 105. The outer ends of these vanes are supported and enclosed by a surrounding cylindrical rim 106. The shape of the vanes 105 is shown in Figure 3, there being a concave face 107 exposed to the clockwise directed fluid flow from the vanes 82. The rear sides of the vanes 105 are of convex shape as indicated at 108.

The various sets of vanes just described constitute successive working stages disposed in series in a fluid circuit leaving the rim of the impeller and returning to the eye of the impeller. The large and small vanes between the side walls of the impeller define passages 110 through which the fluid travels in radial directions as indicated by the arrow 111 in Figure 1. The discharge from the impeller is received directly in the passages 87 between the vanes 82 in which passages it travels in a diagonally spiral direction as it moves axially in a rearward direction towards a circumferential annular passage 113 in the housing 20. In the passage 113 the fluid flow spirals inwardly to a smaller radius of rotation and then reverses its axial movement to a forward direction as it impinges tangentially upon the concave sides 107 of the bucket vanes 105 of the runner, the flow through the runner being indicated generally by the arrow 114 in Figure 1. The fluid is discharged from the runner into an annular passage 115 defined by the curved wall 88 of the reaction member 80, where it may circulate in high speed rotation in either a clockwise or counterclockwise direction according to the direction of its discharge from the runner. In the annular passage 115 the rotating fluid crowds inwardly, and then axially as indicated by the arrow 116, through the passages 90 between the vanes 83 of the reaction member, impinging either upon their concave or convex faces, depending upon the direction of fluid rotation at the time. Upon leaving the vanes 83 of the reaction member, the fluid enters into the annular passage 103, where it is free to rotate according to its direction of motion in a tightening spiral path until it is in a position to pass through the eye 85 at the entrance to the impeller. It will be understood that the motion of the fluid through the eye 85, represented by the arrow 117 in Figure 1, is in reality an advancing motion in a spiral path at a high rotational velocity, as though the elemental bodies of fluid were flowing in spiral channels. As this circular flow enters the eye of the impeller, its path would be indicated either by the arrow 76 or the arrow 77 in Figure 4, depending upon its direction of rotation.

The cross sectional area of the passageway through the eye 85 is larger than the cross sectional areas of certain of the other passages through which the fluid passes, but this does not result in a lower fluid velocity through the eye 85 because the fluid does not travel straight through in an axial direction, but as a mass whirls around the axis in a close spiral to enter the eye of the impeller without end thrust or shock. An important feature and mode of operation in the present arrangement and construction is the maintenance of a uniform high velocity circular flow of the fluid in all parts of the circuit. The various passages are designed to maintain this circular flow even as the fluid returns back to the impeller, as indicated by the arrows 76 and 77 in Figure 4. If the passage through the eye 85 were not of increased cross sectional area, a circular flow therethrough would be impossible without accelerating the fluid at that point, because then the area of the passage would just handle the volume of fluid in direct flow.

In the fluid circuit through the various vanes and passages it will be observed that the fluid always advances in an axial direction in working stages of the circuit and travels in a spirally radial direction in non-working parts of the circuit between working stages, referring to the reaction vanes and runner vanes as working stages of the circuit where the fluid converts some of its kinetic energy into torque, and disregarding the impeller where torque is converted into kinetic fluid energy. Thus, the fluid moves rearwardly through the reaction vanes 82 at a constant radius of rotation until it reaches the passage 113, where its axial movement is temporarily arrested and it is crowded into a smaller radius of rotation. The annular passage 113 also operates to reverse the axial movement of the liquid to send it back through the runner vanes 105 on its new radius of rotation. In the annular passage 115 the moving mass of fluid again contracts to a smaller radius of rotation and reverses its direction of axial movement in preparation for passing through the reaction member vanes 83. In the annular passage 103 the revolving fluid is crowded into a radius of rotation corresponding to the opening in the eye of the impeller, and moved axially and spirally forward to be received by the impeller. This action is facilitated by the formation of smooth curves on the impeller and runner hubs 71 and 101, in the reaction member and runner wall portion 88 and 102, and in the wall of the housing 20 which outlines the annular passage 113.

The fluid driving chamber 23 is sealed at all joints by a shaft seal 123 in the end member 58, a sealing ring 125 between the end member 58 and the housing 20, and a hub seal 124 in the partition wall 26, all shown in Figure 1.

*Gearing component*

The hub 101 of the runner extends rearwardly through the wall or partition 26 into the gearing chamber 25, where it mounts a pinion or sun gear 120. Rotational support for the hub 101 is provided by a bearing 121 in the wall 26, and a floating sleeve bearing 122 operating as a pilot bearing on the end of the shaft 33, as shown in Figure 6. The impeller and the runner thereby cooperate in furnishing mutual support and alignment to keep these parts running true and with the proper relative clearances.

Within the gearing chamber 25 the housing 20 is provided with bearings for a pair of shafts 126 carrying planet gears 127 in mesh with the sun gear 120. Integral with the gears 127 are smaller gears 128 shown in mesh with a sliding gear 130. The sliding gear 130 is carried on splines 131 on the inner end of a power output shaft 132 which is attached at its outer end to the driven shaft 11, which drives the vehicle. The position of the sliding gear 130 is controlled by a rod 133 contained within the shaft 132, so that it may be moved out of engagement with the gears 128 and into engagement with the reversing gears 134. The reversing gears 134 are integral with gears 135 on shafts 136 mounted in bearings in the housing 20, so that the gears 135 are constantly in mesh with the gears 128. The relationship of the various gears is shown in Figures 1 and 2. Manipulation of the rod 133 to shift gears is effected by a bearing collar 140 which may be shifted axially by means of a hand lever 141. In normal forward drive the gears are maintained in the meshing relation shown in Figure 1. To obtain reverse drive the lever 41 is shifted to its opposite extreme position to mesh the sliding gear 130 with the reverse gears 134. Further details of the shifting mechanism will be hereinafter described in connection with the overrunning brake 19.

Under certain conditions, as when starting the vehicle engine through the rear wheels, it may be desirable to establish a direct mechanical connection from the driven shaft 11 to the crank shaft 10. This may readily be accomplished in the present transmission by moving the sliding gear 130 to an intermediate position where it will engage both the forward gears 128 and the reverse gears 134 to lock the shaft 132 to the housing 20, and then engaging the teeth 62 and 63 of the dog clutch 17 to lock the housing 20 to the shaft 33. In this condition there is no relative motion of any of the parts within the housing 20, and the whole assembly revolves as a unit with the flywheel 14.

*Fluid pumping system*

When the transmission is in operation it is desired that the fluid driving chamber 23 be maintained completely full of hydraulic fluid under greater than atmospheric pressure to keep air therefrom, and that the gearing chamber 25 contain a reserve supply of this fluid and make provision for variation in the volume of the fluid. Figures 5, 6 and 7 disclose a novel pumping system for transferring the hydraulic fluid from the chamber 25 to the chamber 23, and for maintaining the desired fluid pressure in the latter chamber. As has previously been pointed out, the impeller hub 71 is fixedly mounted on the shaft 33 so as to rotate therewith, whereas the runner hub 101 rotates on the pilot bearing bushing 122 and in the bearing 121 in the wall 26. The arrangement of these parts is best shown in Figure 6. The impeller 70 is accurately seated in the proper axial position by means of a nut 149 on the shaft 33. The extreme end of this shaft is reduced below the threads which hold this nut to turn in relative movement in the bushing 122. Centrally contained within these parts is a hollow tube 150 engaging the inside of an axial bore 151 in the runner hub 101 in a nonrotative press fit and extending rotatively into an axial bore 152 in the impeller hub 71 to form an additional bearing to maintain the alignment of shaft 33 and the runner hub 101. A bushing or sleeve 153 is interposed between the tube 150 and the shaft 33, and a thrust washer 154 is interposed between the end of this shaft and the runner hub 101. The tube 150 thus constitutes a shaft extending within the shaft 33, and is provided with an eccentric end 155 for reciprocating a piston 156 in a small radial cylinder 157 extending through the hub 71 and the shaft 33. The piston 156 contains a spring 158 holding it against the eccentric 155. Upon relative rotation between the tube 150 and the shaft 33, fluid is drawn through a passage 160 into the space in the bore 152 around the eccentric 155, and is forced out through an opening 161 by reciprocation of the piston. A ball check valve 162 seated by a spring 163 prevents leakage of the fluid back through the pumping system. The springs 158 and 163 are seated within a perforated retaining ring 164. In order to assemble the runner 100 on the shaft 33 a ring 165 is placed in the hole 152 beneath the piston 156 to hold the piston back out of the hole 152 so that the eccentric 155 may be inserted beneath the piston. When the tube 150 is inserted in the hole 152 the eccentric 155 pushes the ring 165 ahead of it until it snaps clear of the piston as shown in Figure 6. The opening in the ring 165 allows for the entrance of fluid from the channel 160 into the space around the eccentric.

The outer end of the tube 150 contains a spring 166 seating an intake ball check valve 167 in an intake opening 168 in a flanged plug 169 which holds the sun gear 120 on the runner hub 101. Rotatably mounted in the plug 169 is a T fitting 170 receiving the ends of oppositely extending oil tubes 171 whose outer ends are secured closely adjacent the wall of the housing 20 within the oil reservoir in gearing chamber 25. As shown in Figure 7, the ends of the tubes 171 are secured by clamps 172 to lugs 173 at diametrically opposite points on the inside wall of the housing 20. Gravity operated ball check valves 174 retained by pins 175 operate to open submerged ends of the tubes 171 and to close said ends when they are not submerged. When the housing 20 is stationary or revolving very slowly, the balls will assume the relative positions shown in Figure 6 to open the lower end of the tube and to close the upper end. If the chamber 25 is then kept slightly more than half full of fluid, the pumping system will never run dry. When the housing 20 is rotating with sufficient speed to distribute the fluid in a cylindrical ring around the outer wall thereof, both balls 174 will be thrown outwardly by centrifugal force to admit oil in both ends of the tubes 171. Relative rotation of the runner 100 with respect to the housing 20 is accommodated by rotation of the plug 169 with respect to the fitting 170. This pumping system is designed particularly to avoid a leakage of air through the seal 123 when the fluid in chamber 23 contracts upon cooling. Upon a reduction of fluid pressure in this chamber below atmospheric, the ball check valves 162 and 167 will readily unseat to draw in fluid from the reservoir in the chamber 25 without admitting air through the seal 123. It will be observed from Figures 5 and 6 that the pumping chamber is free and open in all positions of the piston 156 and eccentric 155 to admit fluid through the channel 160 and passage 161 when the parts are at rest. In this connection it is pointed out that there is always a certain minimum clearance gap between the eccentric 155 and the inner end of the passage 161 so that this passage will not become closed or obstructed by the eccentric if the parts should come to rest in the position shown in Figure 5.

Figure 8 discloses a ball check valve 180 to bleed excessive pressures from the chamber 23 back into the chamber 25 to allow for expansion of the fluid under high temperature operating conditions. A plurality of passages 181 in the wall of the housing 20 establish communication between the chamber 23 and an annular groove 182 leading to a central passage 183 in a plug 184. The ball 180 is seated against the end of the passage 183 by means of a spring 185, which bottoms in a hole having a reduced opening 186 communicating with the chamber 25. The spring 185 is of sufficient stiffness to withstand the normal operating pressures developed in the chamber 23, but will yield under excessive fluid pressures to bleed fluid back into the chamber 25 until the excessive pressure is reduced. In the chamber 25 considerable volumetric change is permitted through the provision of a flexible diaphragm 187 tensioned inwardly by a spring 188 as shown in Figure 1. Suitably located filler and drain plugs such as the plug 189 may be provided in both chambers 23 and 25.

Referring again to Figure 1, it will be seen that the shaft 132 is carried in a sleeve bearing 190 and an oil sealing bearing assembly 191, both in the end member 59 of the housing 20. The bearing assembly 191 includes clamping means 192 to seal the diaphragm 187 around the bearing. Within the hollow shaft 132 a suitable packing gland is also provided around the push rod 133.

Overrunning clutch

Referring now to Figure 11, it will be seen that the push rod 133 carries a pilot end 195 supported in a sleeve 196 in the shaft 132. A flat pin 197 passes through the rod 133 and is contained within a slot 198 in the shaft 132 with its ends received in an inner member 199 of the bearing collar 140. The outer member 200 of the bearing collar 140 is nonrotative, but is arranged to be moved longitudinally by the shift lever 141 to the extent permitted by the length of the slot 198. The shaft 132, push rod 133, pin 197, and inner member 199, thereby revolve together as a unitary assembly within the stationary outer member 200, and the bearing assembly 201 transmits the longitudinal movements of the outer member to the inner member to shift the sliding gear 130 in the manner previously referred to.

Rotation of the outer member 200 is prevented by a plurality of pins 202 slidably mounted in a cover plate 203 on the end of the stationary casing 21. The pins 202 are provided with heads 204 and springs 205, and have their inner ends attached to a ring 206 in the overrunning brake mechanism previously referred to generally by the numeral 19.

The construction of the overrunning brake is best shown in Figures 9, 10 and 11. The end member 59 of the housing 20 is rotatable in the bearing 61, and in turn provides a concentric bearing for the shaft 132 as shown in Figure 11. Secured on the member 59 adjacent the bearing 61 by means of a nut 207 and a key 208 is a ring 209 having a plurality of oppositely ramped depressions 210 containing loose rollers 211. Surrounding the ring 209 is a ring or raceway 212 locked in the casing 21 by means of the keys 213. The ring 212 has a smooth cylindrical inner surface of sufficient diameter to clear the rollers 211 when they are centralized in the depressions 210, but which will engage and bind the rollers against the ring 209 when they are not centralized in these depressions. The rollers 211 have freedom for radial movement between rings 209 and 212 but are each closely confined between a pair of pins 214 extending between rings 215 and 216 and comprising a cage to control the circumferential position of the rollers with respect to the depressions 210.

Rotational movement of the cage and rollers is controlled by pairs of slots 217 and 218, receiving pins 220 carried by the ring 209. With the pins 220 extending through the slots 218, as shown in Figure 10, the ring 209 is free to rotate a limited distance to the right with respect to the cage, but it cannot move to the left without taking the cage with it. However, a relative movement of the ring 209 within the cage causes the rollers 211 to ride up out of the depressions 210 and lock against the outer ring 212. The housing 20 which is integral with the ring 209 is, therefore, locked against reverse rotation in the stationary casing 21 which is integral with the outer ring 212. It will be observed that movement of the ring 209 and the pins 220 to the right in Figure 10 corresponds to reverse rotation of the housing 20, and that movement of these parts to the left in Figure 10 corresponds to forward rotation of the housing with reference to a conventional clockwise rotating engine crank shaft viewed from the front end. In other words, when the housing 20 attempts to rotate backwards, the ring 209 and pin 220 move a slight distance to the right in Figure 10 sufficient to raise the rollers 211 into wedging engagement with the outer ring 212 to prevent any further reverse rotation of the housing 20. On the other hand, the housing 20 is free to rotate in a forward direction because the pin 220 is already at the left end of the slot 218, and upon moving to the left in Figure 10 there is no relative movement of the ring 209 with respect to the rollers 211. The rollers 211 are thereby maintained centralized in the depression 210 where they cannot bind the rings 209 and 212 together in forward movement. To insure relative movement between the ring 209 and the roller cage when the housing 20 tends to rotate in reverse, small frictional elements such as pieces of brake band 221 are mounted on light spring elements 222 between certain of the pins 214 to exert a slight drag on the stationary outer ring 212. This drag need be only sufficient to overcome the frictional drag existing between the ring 209 and the cage.

It has been stated with reference to Figures 1 and 11 that the bearing collar 140 may be moved axially by the reversing lever 141 to move the sliding gear 130 rearwardly to an intermediate position in engagement with both gears 128 and 134 to lock the housing 20 to the driven shaft 132. The length of the pins 202 is such that the member 200 does not engage the heads 204 until the sliding gear 134 has cleared the forward gear 128. In the final part of the movement of the sliding gear 130 into complete mesh with the reversing gear 134, the pins 202 are carried a short distance along with the member 200 to move the ring 206 to the right as viewed in Figure 11. The pins 220 are carried by a rotating ring 223 which engages both sides of the nonrotating ring 206 whereby the latter ring functions as a shifter element to withdraw the pins 220 from the short slots 218 in the ring 216. Inasmuch as the rollers 211 are centralized in the depressions 210, as shown in Figure 9, when the parts are in the relative positions shown in Figure 10 wherein the pins 220 are in the mid portions of the slots 217, the withdrawal of the pins 220 from the slots 218 permits slight relative movement in either direction between the ring 209 and the rollers 211, the result of which is to lock the housing 20 to the nonrotative casing 21. This locking action is intended only for reverse drive, and, as has been stated, is not effected until the reverse gear is substantially fully meshed. The described operation is assured in reverse as well as in forward drive by the friction elements 221 which tend to hold the rollers 211 in fixed positions.

When the reversing lever 141 is moved back to forward drive, as shown in Figures 1, 10 and 11, the pins 202 follow the member 200 in its movement to the left as viewed in Figures 1 and 11, until the ends of the pins 220 strike the ring 216, assuming that the slot 218 is not then in a position to receive the pins. If the impeller is operating, the torque on the housing 20 is reversed by shifting the sliding gear 30 from the reverse gear 134 to forward driving gear 128, causing the ring 209 to move to the right in Figure 10 until the pins 220 are snapped into slots 218 by the action of the springs 205. When the member 200 is shifted to forward driving position as shown in Figure 11, the springs 205 are slightly compressed to hold the pins 220 in the slots 218. Here again relative rotation of the ring 209 with respect to the ring 216 to engage the pins 220 in the slots 218 is assured by the action of the friction members 221 as they apply a light drag to the roller cage. Once the pins 220 have snapped through the ring 216, the housing 20 is again free for forward rotation but remains locked against reverse rotation.

*Operation*

If the vehicle is not to be driven immediately upon starting the engine, the clutch 16 may be disengaged to warm up the engine. When the vehicle is to be started in forward drive, the lever 141 should be in position to engage the sliding gear 130 with the gears 128, and the dog clutch 17 should be disengaged, as shown in Figure 1. When the clutch 16 is engaged, the impeller 70 will rotate in a clockwise direction as indicated by the arrow 75 in Figures 3 and 4. With the engine operating at idling speed, the hydraulic fluid in the chamber 23 is circulated through the various vanes at relatively low velocity so that a relatively small torque is transmitted to the shaft 132 and driven shaft 11. When the engine is accelerated, the hydraulic fluid is discharged in streams moving at high velocity through the impeller passages 110 and splitting across the diagonal reaction vanes 82 in a non-pulsating even flow. The circular motion of the fluid produces a forward torque on the vanes 82, tending to rotate the housing 20 in a forward direction as indicated by the arrow 225 in Figure 3, but this torque is opposed by the superior reaction torques of the vanes 83 and the planet gears 127, so that the resultant torque on the housing 20 is in a reverse direction causing the housing to be held stationary during this phase of operation by the overrunning brake 19. When the reaction vanes 82 are stationary, they function merely as guide vanes to direct the fluid flow in a forward or clockwise direction in the annular passage 113, as indicated by the arrow 226. In the passage 113 the fluid revolves in a circular direction at high velocity and moves radially inwardly until it is rotating on the same radius as the runner vanes 105. The fluid then moves into the runner vanes in a helical path having circumferential and axial velocity components as indicated by the arrows 227. When the runner vanes 105 are moving at a low speed relative to the fluid velocity, the rotational movement of the fluid will be reversed by the bucket surfaces 107 so as to emerge in the direction of the arrow 114 in Figure 3 and rotate in the chamber 115 in a backward direction. In changing its direction from clockwise to counterclockwise rotation, the reaction of the high velocity fluid exerts a driving force on the vanes 105 which develops a forward torque in the runner hub 101 to drive the gear 130 through the gears 120, 127, and 128 in the now stationary housing, the torque multiplication in the gearing component under this condition being approximately two to one.

In the annular passage 115 the fluid moves radially inwardly to a smaller radius of rotation in a position to enter the reaction vanes 83 with circumferential and axial velocity components as shown by the arrows 229. In passing through these vanes the fluid exerts a reverse or counterclockwise torque which is added to the counterclockwise reaction of the gears 127 and 128 and which is resisted in the manner previously mentioned by the external abutment provided in the overrunning brake 19.

From the vanes 83 the fluid is discharged with a counterclockwise rotation, as indicated by the arrows 116 and 230, for circular movement in the last annular passage 103. The fluid spiral tightens in this passage to the diameter of the eye opening 85 and moves therethrough and into the eye of the impeller in a counterclockwise helical path, as indicated by the arrows 76 in Figure 4. The large vanes 79 of the impeller are inclined backwardly to provide an easy entrance to reverse rotating fluid to avoid shock and energy losses under this condition of operation, and to increase the radial flow through the impeller which produces a high velocity of fluid flow. The practical result accomplished by this construction and mode of operation is rapid acceleration of the fluid flow in starting which produces a more rapid acceleration of the vehicle from a standing start than can be obtained in conventional fluid driving transmissions. In the impeller the high velocity radial flow has imparter thereto a clockwise rotation ending in a substantial tangential thrust by the curved blade ends 78 which add a tangential component to the radial velocity component. In this way, it is believed that the power output of the engine is utilized to the best advantage to most rapidly accelerate the hydraulic fluid to the high velocity necessary for high starting torque. The advantage of high starting torque is, of course, not limited to vehicular applications as it is desirable in power transmissions for all purposes, and it is not intended to limit the present transmission to any particular use.

The interposition of the small vanes 74 between the outer ends of the large vanes 73 increases the efficiency and discharge of the impeller by preventing local return flow or eddies behind the tips of the large vanes.

It is to be emphasized that the predominant direction of fluid flow in the passage 115 at the outlet of the turbine runner is in a circular direction, and that at low runner speeds the axial component of the fluid velocity is relatively small. Furthermore, the width of the passage 115 in an axial direction is relatively small so as to cause the wall 88 to deflect fluid leaving the runner in the direction of the arrow 114 in Figure 3 immediately into a circular path as indicated by the arrow 228. If the wall 88 were not present, the arrow 114 would gradually change its direction with higher runner speeds until it had shifted to the new position indicated by the broken arrow 114'. The passage 115, however, does not allow space for a gradual change in the direction of flow of the liquid therein, since the flow is constrained to a circular path where it must travel either in one direction or the other. Therefore, as the speed of the runner increases, the fluid circulation in the passage 115 will continue in the direction indicated by the arrow 228 until the arrow 114, considered as a velocity vector immediately at the edges of the vanes 105, shifts past the perpendicular, and then the entire circular flow in the passage 115 must reverse abruptly to the direction indicated by the broken arrow 228'.

In its new direction of rotation, the velocity components of fluid about to enter the vanes 83 are indicated by the arrows 229'. This direction of flow directs the fluid against the concave sides 91 of the vanes 83, exerting a clockwise or forward torque on the reaction member 80 in addition to the forward torque exerted upon the vanes 82, and the parts are proportioned and designed so that the sum of these two forward torques is superior to the counterclockwise reaction torque exerted by the gears 127 and 128. When the runner has attained a certain speed, the housing 20, therefore, leaves the abutment provided by the overrunning brake 19, and begins to rotate in a forward direction but at a slower speed than the runner.

The power flow which had been diverted exclusively through the runner while the housing was stationary is now divided between two paths comprising the runner and the reaction member, or housing, to produce a multiplication of torque in the fluid driving component in addition to the torque multiplication in the gearing component. In the gearing component, also, the power flow is divided in two paths comprising the sun gear 120 and the revolving housing 20 operating as a planet carrier. When the housing revolves, the vanes 82 and 83 may be considered as operating as a combination fluid coupling and torque converter transmitting torque to the gearing component in parallel with the runner with which it then shares the load. Thus, the torque output of the reaction member, or housing, is then added to that of the turbine runner to maintain a high torque multiplication in the fluid driving component in intermediate operating speeds. As the speed of the runner increases, the speed of the housing tends to increase also, with the result of effecting a higher speed transmission ratio, which is desired as the vehicle or other machine operated by the transmission gets into motion.

When the housing is revolving slowly relative to the speed of the fluid circulation, the discharge from the vanes 83 will be in the direction of the previously mentioned arrow 116 to produce a counterclockwise circulation in the passage 103, as indicated by the arrow 230. As the speed of the housing increases, the direction of the arrow 116, considered as a velocity vector for liquid leaving the tips of the vanes 83, would tend to slowly shift to the position shown by the broken arrow 116', but the direction of circulation of the mass of liquid in the passage 103 is prevented by the adjacent confining wall 102 from changing gradually from the position of the arrow 230 to the arrow 230'. Therefore, at a certain critical speed of the housing relative to the fluid velocity, the fluid circulation in the passage 103 will abruptly change and flow in the forward direction indicated by the broken line arrow 230'.

Fluid circulating in this direction passes through the eye opening 85 in a clockwise spiral and enters the eye of the impeller in the direction indicated by the broken line arrows 77 in Figure 4. By maintaining a uniform velocity in a closed circuit the rotational velocity of the returning fluid will be substantially equal to that of the fluid leaving the impeller. Inasmuch as the inner ends of vanes 73 rotate at about half the linear speed of the outer ends, the fluid entering the eye of the impeller impinges against the back sides of these vanes on curved surfaces 79 to produce an additional force over that of the input power to help drive the impeller. As the fluid moves out through the vanes 73 and 74, it is again discharged with radial and tangential velocity components into the moving vanes 82 which then function both as guide vanes and additionally as a fluid coupling runner in the manner described.

Thus it is seen that a compound torque multiplication is achieved in the two components of the present transmission substantially throughout its operating range by providing two paths of power flow through interconnected elements in the two components. The present transmission obtains an unusually high torque multiplication in the fluid driving component by maintaining the hydraulic fluid in circular movement between a succession of working stages and by utilizing reaction forces from reversals of this circular movement to develop torque in the working stages without arresting the circular motion of the fluid.

Having now described my invention and in what manner the same may be used, what I claim as new and desire to protect by Letters Patent is:

1. In a power transmission, an impeller and a plurality of fluid driven members in a fluid circuit, sets of axial flow vanes on said members at different radial distances from a common axis of rotation, the outermost set of vanes receiving the discharge from said impeller, means at the discharge side of each set of vanes except the innermost set to reverse the direction of axial flow into the next radially inward set of vanes, and means at the discharge side of the innermost set of vanes to reverse the direction of axial flow and return the flow to the eye of the impeller.

2. In a power transmission, an impeller and a plurality of sets of vanes constituting working stages in a return fluid circuit to the eye of the impeller, and annular passages at opposite ends of said stages for directing hydraulic fluid from said impeller back and forth in opposite axial directions through said working stages in succession before the fluid is returned to the impeller.

3. In a power transmission, a rotary fluid impeller and a plurality of coaxial bladed wheels in a fluid circuit, said bladed wheels constituting successive axial flow working stages for the transmission of torque from said impeller, means at the discharge side of each stage before the last stage to reverse the direction of axial flow into the next stage, and means at the discharge side of the last stage to reverse the direction of axial flow and return it to the eye of the impeller.

4. In a power transmission, an impeller having a radial discharge, a reaction member having a first set of vanes surrounding said impeller and directing said radial discharge in an axial flow, a runner concentric with said first set of vanes and receiving the discharge therefrom in a reverse axial flow, a second set of vanes on said reaction member concentric within said runner vanes and receiving the discharge therefrom in the direction of said first axial flow, and means for completing the fluid circuit in a reverse axial flow within said second set of vanes back to the eye of the impeller.

5. In a power transmission, a fluid torque converter comprising an impeller, a reaction member and an axial flow runner in a fluid circuit, said impeller having a radial discharge, said reaction member having diagonal guide vanes portions of which surround said impeller and receive the output therefrom, an axial flow runner concentric within other portions of said guide vanes, and a set of axial flow vanes on said reaction member concentric within said runner.

6. In a power transmission, a torque converter comprising a radial flow impeller, a reaction member having an axial flow first stage a portion of which surrounds said impeller, an axial flow runner within another portion of said first stage, said reaction member having a second axial flow stage within said runner, and means for mounting said reaction member for rotation to produce a driving torque.

7. In a power transmission, an impeller, a plurality of fluid driven members mounted for rotation about a common axis, sets of axial flow vanes on said members at different radial distances from said axis, and a fluid circuit through said sets of vanes in series wherein hydraulic fluid is directed into said sets of vanes in opposite axial directions in successive working stages and moved radially from one working stage to the next, starting with the outermost, and from the last and innermost working stage back into the eye of the impeller.

8. In a fluid power transmission, an impeller, a plurality of working stages comprising sets of rotatable axial flow vanes arranged one within the other in concentric relation, and a fluid driving circuit for guiding hydraulic fluid axially through said sets of vanes in opposite axial directions in successive working stages and radially between said sets of vanes before the fluid is returned to the impeller.

9. In a power transmission, an impeller, a plurality of rotary fluid driven members of different diameters nested together in concentric relation each having vanes for guiding hydraulic fluid axially therethrough at a constant radius of rotation, and annular chambers on opposite sides of said members for moving the fluid flow radially from each of said members to the next inner member and for reversing the axial direction of flow at the entrance to each driven member, before the fluid is returned to the impeller.

10. In a power transmission device, a reaction member having a first set of vanes confined between inner and outer cylindrical shells, a runner concentric within said first set of vanes and having vanes confined between inner and outer cylindrical shells, and a second set of vanes on said reaction member confined between inner and outer shells concentric within said runner vanes.

11. In a power transmission device, an impeller, a reaction member having a first set of vanes confined between outer and inner cylindrical shell members, a runner within said first set of vanes having vanes confined between inner and outer cylindrical shells, and a second set of vanes on said reaction member within said runner and confined between inner and outer shells, said last mentioned inner shell having a diameter corresponding to the diameter of the eye of the impeller.

12. In a power transmission, a fluid impeller having a radial discharge, a reaction member having a first set of vanes surrounding said impeller and receiving the discharge therefrom, a cylindrical wall inside said first set of vanes, a runner concentric within said cylindrical wall and receiving the discharge from said first set of vanes, a cylindricial wall within said runner, a second set of vanes on said reaction member concentric within said runner, a cylindrical wall within said second set of vanes, and annular passages forming a fluid circuit around the ends of said walls to define a fluid circuit back to the eye of said impeller.

13. In a power transmission, an impeller arranged to pump hydraulic fluid through a working circuit to transmit torque from a driving shaft to a driven shaft, a plurality of sets of vanes in said circuit acted upon by said fluid in axial flow, and means for reversing the direction of axial flow in each successive set of vanes before the fluid is returned to the impeller, all the vanes in said working circuit being capable of exerting a driving torque on said driven shaft.

14. In a power transmission, an impeller having a radial discharge, a rotatably mounted reaction member having a first set of vanes surrounding said impeller to receive the output therefrom and direct it in axial flow, said first set of vanes being disposed diagonally with the axis of said impeller, a runner receiving the discharge from said first set of vanes in reverse axial flow, and a second set of vanes on said reaction member receiving the discharge from said runner in the direction of said first axial flow.

15. A power transmission comprising a housing mounted for rotation, a partition in said housing forming fluid driving and gearing chambers therein, said gearing chamber constituting a reservoir for hydraulic fluid, a pump between said chambers having an inlet in said gearing chamber and an outlet in said fluid driving chamber for pumping fluid from said reservoir into said fluid driving chamber, means for operatively connecting the inlet for said pump with the body of fluid in said reservoir regardless of whether said housing is revolving or stationary, and a direct passage through said inlet and said pump capable of conveying fluid from said reservoir to said fluid driving chamber when the pressure in said fluid driving chamber falls below the pressure in said gearing chamber when said pump is not operating, and means to bleed fluid back into said gearing chamber when the pressure in said fluid driving chamber becomes excessive.

16. A power transmission comprising a rotatably mounted housing having a fluid driving chamber and a gearing chamber, a member mounted for rotation in said housing extending into both of said chambers, pump means in said member for pumping hydraulic fluid from said gearing chamber to said fluid driving chamber, a pair of inlets for said pump means on diametrically opposite sides of the internal periphery of said gearing chamber, and valve means in said inlets responsive to gravity to close the uppermost inlet and open the lowermost inlet when the housing is stationary or revolving slowly and responsive to centrifugal force to open both inlets when the housing is revolving rapidly in order to open the submerged inlets and close the emerged inlets under all operating and non-operating conditions of said transmission.

17. In a power transmission, a rotatably mounted housing comprising a fluid driving chamber and a gearing chamber, impeller and runner members mounted for independent rotation in said fluid driving chamber and said runner member extending into said gearing chamber, pump means in said runner member for pumping hydraulic fluid from said gearing chamber into said fluid driving chamber, means for operating said pump by the relative rotation of said impeller and runner members, and means in said runner member to prevent the return of fluid back through said pump to said gearing chamber.

18. In an hydraulic transmission, an impeller adapted to receive a fluid intake in either forward or counter rotating flow, said impeller having blades with concave rear surfaces near their inlet ends to utilize the kinetic energy of said forward rotating flow to assist in driving said impeller, said blades being backwardly inclined to receive a counter rotating flow without shock and change said flow into radial flow utilizing the initial counter rotational velocity to produce additional radial velocity, and forwardly curved outlet ends on said blades to throw the fluid tangentially as it leaves the impeller to add a tangential velocity component to the radial velocity component.

19. In an hydraulic transmission, an impeller having backwardly inclined blades with reference to the direction of rotation, concave rear surfaces near the inlet ends of the blades, forwardly curved outlet ends on said blades, and short blades between said blades to prevent return circulation and eddies behind said outlet ends of said blades.

20. In a power transmission, a bladed impeller having throats between the blades, an axial flow runner, axial flow guide vanes having portions surrounding said impeller and other portions surrounding said runner, and an annular channel at the discharge side of said guide vanes to direct the fluid flow axially into said runner, said guide vanes being arranged diagonally across each throat of said impeller to divide the fluid flow from each said throat over two or more vanes to avoid power impulses.

21. In a power transmission, a fluid impeller having radial flow blades, a rotatable reaction member having means to prevent reverse rotation, a first set of axial flow blades on said reaction member receiving the discharge from said impeller, a runner having a set of curved axial flow blades receiving a tangential discharge from said first set of reaction member blades and shaped to reverse the tangential direction of said discharge when the speed of the runner is relatively slower than the velocity of fluid flow, a second set of axial flow blades on said reaction member, and an annular channel concentric with the axis of said reaction member in the fluid circuit between said runner blades and said second set of reaction member blades to constrain the tangential discharge from said runner blades to flow to said second set of reaction member blades in a circular path in said channel.

22. In a fluid power transmission, an impeller having radial flow blades and an axial flow input eye, a reaction member mounted for rotation in the direction of said impeller and having means to prevent reverse rotation, a first set of blades on said reaction member surrounding said impeller and directing the discharge from the impeller in an axial direction, a turbine runner at one side of said impeller having axial flow blades concentric within said first set of reaction blades, said reaction member having a smooth curved wall defining an annular channel communicating with the discharge side of said first set of reaction blades and the input side of said runner blades, a second set of blades on said reaction member concentric within said runner blades, a second smooth curved wall on said reaction member defining an annular channel communicating with the discharge side of said runner blades and the input side of said second set of reaction blades, and a smooth curved wall on said runner defining an annular channel communicating with the discharge side of said second set of reaction blades and the input eye of said impeller.

DANIEL F. McGILL.

REFERENCES CITED

The following references are of record in the file of this patent:

UNITED STATES PATENTS

| Number | Name | Date |
|---|---|---|
| 1,199,360 | Föttinger | Sept. 26, 1916 |
| 1,304,566 | Hornbrook | May 27, 1919 |
| 1,327,080 | Brown | Jan. 6, 1920 |
| 1,600,626 | Ford | Sept. 21, 1926 |
| 1,696,307 | James | Dec. 25, 1928 |
| 1,855,967 | Jandasek | Apr. 26, 1932 |
| 1,857,252 | Miller | May 10, 1932 |
| 1,859,607 | Sinclair | May 24, 1932 |
| 2,015,300 | Dell | Sept. 24, 1935 |
| 2,021,574 | Cottrell | Nov. 19, 1935 |
| 2,055,895 | Fawcett | Sept. 29, 1936 |
| 2,129,884 | Swan | Sept. 13, 1938 |
| 2,146,369 | Dodge | Feb. 7, 1939 |
| 2,149,117 | Dodge | Feb. 28, 1939 |
| 2,235,370 | Jandasek | Mar. 18, 1941 |
| 2,240,650 | Heyer | May 6, 1941 |
| 2,276,695 | Lavarello | Mar. 17, 1942 |
| 2,293,767 | Salerni | Aug. 25, 1942 |
| 2,316,390 | Biermann | Apr. 13, 1943 |
| 2,397,869 | Kirby | Apr. 2, 1946 |